US012751452B2

(12) United States Patent
Baum et al.

(10) Patent No.: US 12,751,452 B2
(45) Date of Patent: Oct. 6, 2026

(54) METHOD FOR TREATING TECHNICAL PRODUCTS

(71) Applicant: THOR GMBH, Speyer (DE)

(72) Inventors: Rüdiger Baum, Speyer (DE); Thomas Wunder, Neustadt a.d. Weinstrasse (DE); Roman Grabbe, Neustadt/Weinstrasse (DE)

(73) Assignee: Thor GmbH, Speyer (DE)

( * ) Notice: Subject to any disclaimer, the term of this patent is extended or adjusted under 35 U.S.C. 154(b) by 241 days.

(21) Appl. No.: 18/700,827

(22) PCT Filed: Oct. 5, 2022

(86) PCT No.: PCT/EP2022/000090
§ 371 (c)(1),
(2) Date: Apr. 12, 2024

(87) PCT Pub. No.: WO2023/061620
PCT Pub. Date: Apr. 20, 2023

(65) Prior Publication Data
US 2024/0407365 A1 Dec. 12, 2024

(51) Int. Cl.
*A01N 43/80* (2006.01)
*A01N 25/32* (2006.01)

(52) U.S. Cl.
CPC ............. *A01N 43/80* (2013.01); *A01N 25/32* (2013.01)

(58) Field of Classification Search
CPC ................................ A01N 43/80; A01N 25/32
See application file for complete search history.

(56) References Cited

U.S. PATENT DOCUMENTS 10,633,547 B2 * 4/2020 Baum ...................... C09D 7/63
2019/0071575 A1 * 3/2019 Baum ...................... C09D 7/61

FOREIGN PATENT DOCUMENTS

WO WO 2015082063 A1 6/2015
WO WO 2016034266 A1 3/2016
WO WO 2017148572 A1 9/2017

OTHER PUBLICATIONS

English Translation of PCT International Search Report for PCT/EP2022/000090 dated Jan. 31, 2023.
A German Written Opinion for PCT/EP2022/00090 dated Jan. 31, 2023 (no English translation).
PCT/EP2022/000090, Oct. 5, 2022, WO 2023/061620 A1.

* cited by examiner

*Primary Examiner* — Sahana S Kaup
*Assistant Examiner* — Toriana N. Vigil
(74) *Attorney, Agent, or Firm* — McCarter & English, LLP

(57) ABSTRACT

The invention relates to a method for reducing microbial infestation of an aqueous technical product, comprising the steps: (a) providing an aqueous technical product, for example a dye, having a pH in the range of 7.0-9.5 and containing: i. 25-100 ppm 5-chloro-2-methyl-4-isothiazolone (CMIT) and ii. 50-1000 ppm of one or more zinc compound(s), selected from the group consisting of zinc oxide, zinc carbonate, zinc hydroxide and zinc hydroxycarbonate; (b) breaking down some of the CMIT by adding at least one pyrithione compound selected from sodium pyrithione, potassium pyrithione and calcium pyrithione, in a total amount in the range of 25-500 ppm so that the concentration of the CMIT in the technical product is in the range of 5-15 ppm; and (c) storing the technical product over a period of up to 9 months.

16 Claims, No Drawings

METHOD FOR TREATING TECHNICAL PRODUCTS

The invention relates to a method for reducing microbial contamination of an aqueous industrial product, comprising the steps of: (a) providing an aqueous industrial product, for example a paint, having a pH in the range from 7.0 to 9.5, containing: i. 25 to 100 ppm of 5-chloro-2-methyl-4-isothiazolinone (CMIT) and ii. 50 ppm to 1000 ppm of one or more zinc compounds selected from the group consisting of zinc oxide, zinc carbonate, zinc hydroxide and zinc hydroxycarbonate, (b) decomposing a portion of the CMIT by addition of at least one pyrithione compound selected from sodium pyrithione, potassium pyrithione and calcium pyrithione in a total amount in the range from 25 ppm to 500 ppm, so that the concentration of the CMIT in the industrial product is in the range from 5 to 15 ppm, and (c) storing the industrial product for a period of up to 9 months.

Industrial products, in particular aqueous products, such as paints, varnishes, emulsions and cosmetic products, are usually produced using natural or biodegradable raw materials. These raw materials and the water used as solvent are frequently contaminated with microbes, such as bacteria, yeasts and fungi. If these products are produced without a preservative, they may already have high microbial counts one day after production.

To ensure that these products meet hygiene requirements, thus ensuring the shelf life of the industrial products, so-called biocides are added to the products. One of these biocides is 5-chloro-2-methyl-4-isothiazolinone (CMIT). It has good biocidal activity, but practical handling thereof involves various disadvantages. For example, this compound can trigger allergies in handlers thereof.

To overcome the disadvantages of said CMIT that is extremely effective but also has disadvantages for the end user, the mixture of the isothiazolinones 2-methylisothiazolin-3-one (MIT) and 1,2-benzisothiazolin-3-one (BIT), as disclosed in EP 1 005 271 B1, has been used as biocidal composition since the start of the 1990s. Said mixture is sold by Thor GmbH (Speyer, Federal Republic of Germany) as Acticide® MBS and is presently one of the standards in preservation of water-based paints and plasters/renders in containers. Furthermore, a trend toward low-isothiazolinone preservatives can be observed at present.

Owing to the specific selection of the two isothiazolinones, this biocidal composition has the advantage that it combines a high efficacy with a distinctly low sensitization potential compared to 5-chloro-2-methyl-4-isothiazolinone.

Despite the switch to Acticide® MBS as an alternative to 5-chloro-2-methyl-4-isothiazolinone, the products preserved using Acticide® MBS still contain MIT, which can cause contact dermatitis and also airborne contact dermatitis in allergy sufferers or in highly sensitized persons.

However, on account of the circumstances described at the start, it is not desirable to completely dispense with effective preservatives, in particular the highly effective 5-chloro-2-methyl-4-isothiazolinone.

Newer intended uses of 5-chloro-2-methyl-4-isothiazolinone are shown in the international laid-open publication WO 2015/082063 A1 and the international laid-open publication WO 2017/148572 A1. These documents describe methods for reducing microbial contamination of industrial products, such as paints and plasters/renders, comprising use of 5-chloro-2-methyl-4-isothiazolin-3-one and irreversible and complete destruction thereof with the aid of a so-called 5-chloro-2-methyl-4-isothiazolinone-decomposing compound, so that the end product no longer contains any 5-chloro-2-methyl-4-isothiazolinone that could cause problems in persons highly sensitized to 5-chloro-2-methyl-4-isothiazolinone.

Although the methods disclosed in the above-cited documents advantageously allow the use of 5-chloro-2-methyl-4-isothiazolinone again owing to complete decomposition or degradation thereof in the context of the described methods, it is no longer present in the products as a long-term preservative, which necessitates the use of further preservatives for long-term preservation/storage preservation in a comparatively high concentration.

It is therefore an object of the invention to provide a method for reducing microbial contamination of an aqueous industrial product, in which 5-chloro-2-methyl-4-isothiazolinone can be used not only as a quick-kill biocide but also as a long-term preservative in the production or treatment of an industrial product.

This object is achieved by a method for reducing microbial contamination of an aqueous industrial product, comprising the steps of:

(a) providing an aqueous industrial product having a pH in the range from 7.0 to 9.5, containing:
  - i. 25 to 100 ppm, preferably 25 ppm to 75 ppm, particularly preferably 25 ppm to 50 ppm of 5-chloro-2-methyl-4-isothiazolinone and
  - ii. 50 ppm to 1000 ppm, 75 ppm to 750 ppm, particularly preferably 100 ppm to 500 ppm of one or more zinc compounds selected from the group consisting of zinc oxide, zinc carbonate, zinc hydroxide and zinc hydroxycarbonate, (b) decomposing a portion of the 5-chloro-2-methyl-4-isothiazolinone by addition of at least one pyrithione compound selected from sodium pyrithione, potassium pyrithione and calcium pyrithione in a total amount in the range from 25 ppm to 500 ppm, preferably in the range from 50 ppm to 250 ppm, particularly preferably in the range from 75 ppm to 250 ppm, so that the concentration of the CMIT in the industrial product is in the range from 5 to 15 ppm, preferably in the range from 10 to 15 ppm, and (c) storing the industrial product for a period of up to 9 months.

The amounts specified in ppm in the context of the present invention are based on the proportion of the respective component in relation to the product.

The present invention advantageously makes it possible for 5-chloro-2-methylisothiazolin-3-one to be used not only as a quick-kill biocide but also as a long-term preservative in the production or treatment of industrial products. Since 5-chloro-2-methyl-4-isothiazolinone is still present in relatively low concentrations in the end products, it still effectively counteracts possible microbial recontamination during transport and storage of the products in a container. This is applicable not only to microbial contamination of the product itself, but also to adherent product and condensate on container walls and lids. As a result, it is possible to add smaller amounts of other biocides for long-term preservation of the products. Moreover, the comparatively low concentrations of 5-chloro-2-methyl-4-isothiazolinone in the end products mean that they can be regarded as largely unproblematic for the end user.

The aqueous industrial product provided in method step (a) is generally a product selected from the group consisting of paints, such as exterior paints, interior paints and interior and exterior wood paints, varnishes, stains, printing inks, pasty plasters/renders, such as external renders and internal plasters, filler compounds, emulsions, latices, polymer dispersions, primers, chalk suspensions, mineral slurries, ceramic materials, adhesives, sealants, bitumen emulsions, surfactant solutions, cleaning products, pigment pastes and pigment dispersions, pigment slurries, thickeners, cosmetic products, toiletries, lithographic liquids, liquids in paper processing, liquids in leather production and liquids in textile production. Particularly preferably, the industrial product provided is a paint or plaster/render. The water content of the industrial products can vary over wide ranges and is generally in the range from 5% to 80% by weight.

The pH of the aqueous industrial product is in the range from 7.0 to 9.5, preferably in the range from pH 7.5 to 9.0.

The present invention relates generally to a method for reducing microbial contamination of an aqueous industrial product. In the context of the invention, "for reducing microbial contamination of a product" is to be understood to mean that the introduction of 5-chloro-2-methyl-4-isothiazolin-3-one into the industrial product results in demonstrable slowing or full prevention of the microbial growth of the microorganisms present in the product.

According to a preferred embodiment of the invention, the method according to the invention is carried out as part of the production of the industrial products. In this case, an aqueous industrial product having a pH in the range from 7.0 to 9.5 is prepared in method step (a) by mixing of the individual components of the industrial product which contains:

i. 25 to 100 ppm, preferably 25 ppm to 75 ppm, particularly preferably 25 ppm to 50 ppm of 5-chloro-2-methyl-4-isothiazolinone (CMIT) and
ii. 50 ppm to 1000 ppm, 75 ppm to 750 ppm, particularly preferably 100 ppm to 500 ppm of one or more zinc compounds selected from the group consisting of zinc oxide, zinc carbonate, zinc hydroxide and zinc hydroxycarbonate.

Following the preparation, the 5-chloro-2-methyl-4-isothiazolinone present in the product is partially decomposed in method step (b) by addition of at least one pyrithione compound selected from sodium pyrithione, potassium pyrithione and calcium pyrithione in a total amount in the range from 25 ppm to 500 ppm, preferably in the range from 50 ppm to 250 ppm, particularly preferably in the range from 75 ppm to 150 ppm, so that the concentration of the CMIT in the industrial product is in the range from 5 to 15 ppm, preferably in the range from 10 to 15 ppm.

According to an alternative preferred embodiment of the invention, the method according to the invention is carried out as part of the treatment of an industrial product that has already been produced, for the purpose of reducing the microbial load.

The aqueous industrial product provided or prepared in method step (a) contains 25 to 100 ppm, preferably 25 ppm to 75 ppm, particularly preferably 25 ppm to 50 ppm of 5-chloro-2-methyl-4-isothiazolinone as long-term and short-term preservative. The comparatively high use concentration of 25 to 150 ppm of 5-chloro-2-methyl-4-isothiazolinone at the start of the method allows rapid destruction of the microorganisms present in the product, and so, for example, the microorganisms present in the products from production thereof, such as bacteria, yeasts and fungi, are effectively and quickly inactivated. The 5-chloro-2-methyl-4-isothiazolinone can have been generally added to the industrial product as a preservative in a specific manner; however, it can also have been introduced into the industrial product during the production of the industrial product via a component or via a product constituent preserved with 5-chloro-2-methyl-4-isothiazolinone.

According to one embodiment of the invention, the industrial product provided in method step (a) is substantially free of 2-methyl-4-isothiazolinone. "Substantially free" means that the 2-methyl-4-isothiazolinone is present in the provided product in a total amount of less than 10 ppm, preferably in a total amount of less than 5 ppm, particularly preferably in the range from 0 to 1 ppm.

According to a preferred embodiment of the invention, an industrial product is provided or prepared in method step (a) that contains i. 25 to 100 ppm, preferably 25 ppm to 75 ppm, particularly preferably 25 ppm to 50 ppm of 5-chloro-2-methyl-4-isothiazolinone (CMIT) having a content of 2-methyl-4-isothiazolin-3-one in the range from 0% to 2% by weight, based on the total proportion of 5-chloro-2-methyl-4-isothiazolin-3-one.

A person skilled in the art can prepare the 5-chloro-2-methyl-4-isothiazolinone having the required small proportion of 2-methyl-4-isothiazolin-3-one that is present in the product according to this embodiment of the invention from mixtures of 5-chloro-2-methyl-4-isothiazolinone and 2-methylisothiazolin-3-one with the aid of separation methods known to them, such as chromatography, extraction or fractional precipitation. A person skilled in the art can determine the purity of the 5-chloro-2-methyl-4-isothiazolinone or the content thereof with the aid of methods known to them, for example by means of quantitative HPLC.

The aqueous industrial product provided or prepared in method step (a) contains 50 ppm to 1000 ppm, preferably 75 ppm to 750 ppm, particularly preferably 100 ppm to 500 ppm of one or more zinc compounds selected from the group consisting of zinc oxide, zinc carbonate, zinc hydroxide, zinc hydroxycarbonate and mixtures thereof.

In the context of the present invention, "one or more zinc compounds" means that one of the aforementioned zinc compounds or a plurality, i.e., two, three or four, of the aforementioned zinc compounds are present in the industrial product. The amounts specified in ppm refer to the total amount of zinc compound(s) present in the product.

According to a preferred embodiment of the invention, an industrial product is provided in method step (a) that contains 50 ppm to 1000 ppm, 75 ppm to 750 ppm, particularly preferably 100 ppm to 500 ppm of zinc oxide.

The zinc compound(s) present in the industrial product advantageously interact(s) with the pyrithione compound added in method step (b), thereby allowing, surprisingly, the partial degradation of the 5-chloro-2-methyl-4-isothiazolin-3-one present in the industrial products within the desired period depending on the level of the pyrithione amount added.

To prevent an undesirable, complete decomposition of the 5-chloro-2-methyl-4-isothiazolinone, the zinc compound is present in the industrial product alongside the 5-chloro-2-methyl-4-isothiazolinone before, in method step (b), a portion of the 5-chloro-2-methyl-4-isothiazolinone is decomposed by addition of at least one pyrithione compound.

Owing to the pH of the industrial products in the range from pH 7.0 to 9.5, slight degradation of the 5-chloro-2-methyl-4-isothiazolinone due to pH can be observed in some cases. According to a preferred embodiment of the invention, the industrial products provided are substantially free of 5-chloro-2-methyl-4-isothiazolinone-decomposing components in order to minimize further influences in relation to the possible undesirable degradation of the 5-chloro-2-methyl-4-isothiazolinone. Such components or compounds are known to a skilled person in the technical field. "Substantially free" means that these components are present in the provided composition in a total amount of less than 10 ppm, preferably in a total amount of 5 ppm, particularly preferably less than 1 ppm.

According to a preferred embodiment, the industrial product provided is therefore largely or completely free of:

i. thiol compounds, such as cysteine, mercaptoethanol, mercaptopropionic acid, methyl mercaptopropionate, glutathione, thioglycolate, sodium thiosulfate, sodium bisulfite, mercaptopyridine, dithiothreitol, mercaptoethane sulfonate,
ii. pyrithione compounds, such as sodium pyrithione, potassium pyrithione and calcium pyrithione,
iii. electrophilic compounds that are more electrophilic than 5-chloro-2-methyl-4-isothiazolinone.

"Largely or completely free" means that the aforementioned components i. to iii. are altogether present in the provided composition in a total amount of less than 10 ppm, preferably in a total amount of 5 ppm, particularly preferably less than 1 ppm.

In step (b) of the method according to the invention, a portion of the 5-chloro-2-methyl-4-isothiazolinone present in the industrial product is decomposed by addition of at least one pyrithione compound selected from sodium pyrithione, potassium pyrithione and calcium pyrithione, thereby lowering the content of 5-chloro-2-methyl-4-isothiazolinone in the industrial product to an amount in the range from 5 to 15 ppm. preferably in the range from 10 to 15 ppm.

The at least one pyrithione compound is added to the industrial product in an amount or in a total amount in the range from 25 ppm to 500 ppm, preferably in the range from 50 ppm to 250 ppm, particularly preferably in the range from 75 ppm to 150 ppm. The particular minimum amount of pyrithione compound(s) required will be determined and used by a person skilled in the art depending on the desired final concentration of 5-chloro-2-methyl-4-isothiazolinone in the particular product. The total amount required of the pyrithione compound(s) used will be selected by a person skilled in the art taking into account the intended use. If the pyrithione compound(s) are also to be present in the industrial product as so-called after-preservative or long-term preservative after the partial decomposition of the 5-chloro-2-methyl-4-isothiazolinone, a person skilled in the art will select a correspondingly higher use amount, so that an effective amount of pyrithione compound(s) will remain in the industrial product after the partial decomposition of the 5-chloro-2-methyl-4-isothiazolinone.

In the context of the present invention, "at least one pyrithione compound" means that one of the aforementioned pyrithione compounds or a plurality, i.e., two or three, of the aforementioned pyrithione compounds are present in the industrial product. The amounts specified in ppm refer to the total amount of pyrithione compound(s) present in the product.

According to a preferred embodiment, the method according to the invention is characterized in that the decomposition of the CMIT in method step (b) is effected by addition of sodium pyrithione in an amount in the range from 25 ppm to 500 ppm, preferably in the range from 50 ppm to 250 ppm, particularly preferably in the range from 75 ppm to 150 ppm.

The specific partial decomposition of the 5-chloro-2-methyl-4-isothiazolinone present in the product provided or prepared in method step (a) starts with the addition of the at least one pyrithione compound in method step (b). The moment at which the at least one pyrithione compound is added will be selected by a person skilled in the art taking into account the particular microbial load of the industrial products. In the context of production of the industrial product, it can be, for example, at the end of the production process. However, if the method is a treatment method in which an industrial product with a high microbial load is being treated, a person skilled in the art will allow the 5-chloro-2-methyl-4-isothiazolinone to act for a relatively long period at a high concentration before partially decomposing it by addition of the at least one pyrithione compound.

In method step (c), a portion of the 5-chloro-2-methyl-4-isothiazolinone present in the industrial products is decomposed or degraded with the aid of the at least one pyrithione compound. According to one embodiment of the invention, the method is characterized in that the decomposition of the 5-chloro-2-methyl-4-isothiazolinone in method step (b) is effected within a period in the range from 6 hours to 336 hours, preferably within a period of 12 hours to 168 hours, particularly preferably within a period in the range from 24 hours to 96 hours after addition of the at least one pyrithione compound. "Within the above-defined periods" means that the 5-chloro-2-methyl-4-isothiazolinone is decomposed or degraded starting from the moment of contact with the at least one pyrithione compound, so that the total content of 5-chloro-2-methyl-4-isothiazolinone is in the range from 5 to 15 ppm, based on the product, after said periods. The amount of pyrithione required for the particular partial degradation will be determined by a person skilled in the art using the methods known to them.

In step (c) of the method according to the invention, the industrial product is stored for a period of up to nine months. Over this period, the remaining 5-chloro-2-methyl-4-isothiazolinone and optionally other preservatives present in the industrial product act as long-term preservatives and ensure effective protection against microbial contamination. In the context of the present invention, the term "storage" is understood to mean the storage of the industrial product until it is packaged or sold or, in the case of an intermediate product such as a polymer dispersion, the period of time until it is processed further.

After the partial decomposition of the 5-chloro-2-methyl-4-isothiazolinone in method step (b), the product is ideally free of microbial contamination and, owing to the remaining amount of 5-chloro-2-methyl-4-isothiazolinone, also protected against any new contamination by microbes. However, during the storage of the industrial product in method step (c), the highly reactive and hydrolysis-sensitive 5-chloro-2-methyl-4-isothiazolinone is subject to further degradation or is consumed in the course of preservation, and so the presence of at least one further biocide may be expedient in some cases. Said further biocide or said further biocides can be advantageously added in a lower amount owing to the presence of the 5-chloro-2-methyl-4-isothiazolinone in the above-defined amount. In the context of the present invention, "at least one further biocide" means that a single biocide or a plurality, i.e., two, three, four, five or more, biocides can be present in the industrial product.

According to a preferred embodiment of the invention, an industrial product is therefore provided or prepared in method step (a) that further contains:

iii. 5 ppm to 200 ppm, preferably 5 ppm to 100 ppm, particularly preferably 5 ppm to 15 ppm of one or more compounds selected from the group consisting of 2-methylisothiazolin-3-one (MIT), 2-n-octyl-4-isothiazolin-3-one (OIT) and 2-methyl-1,2-benzisothiazolin-3-one (M-BIT) and/or iv. 5 ppm to 500 ppm, preferably 5 ppm to 400 ppm, particularly preferably 5 ppm to 300 ppm of 1.2-benzisothiazolin-3-one (BIT) and/or v. 10 ppm to 2000 ppm, preferably 50 ppm to 1000 ppm, particularly preferably 100 ppm to 750 ppm of 1,2-octanediol and/or vi. 10 ppm to 2000 ppm, preferably 50 ppm to 1000 ppm, particularly preferably 100 ppm to 750 ppm of ethylhexylglycerol and/or vii. 10 ppm to 9000 ppm, preferably 100 ppm to 6000 ppm, particularly preferably 500 ppm to 4500 ppm of phenoxyethanol and/or viii. 10 ppm to 200 ppm, preferably 50 ppm to 150 ppm, particularly preferably 75 ppm to 100 ppm of 3-iodopropynyl N-butylcarbamate (IPBC).

According to an alternative preferred embodiment, there is/are added to the industrial product in the context of the method according to the invention:

iii. 5 ppm to 200 ppm, preferably 5 ppm to 100 ppm, particularly preferably 5 ppm to 15 ppm of one or more compounds selected from the group consisting of 2-methylisothiazolin-3-one (MIT), 2-n-octyl-4-isothiazolin-3-one (OIT) and 2-methyl-1,2-benzisothiazolin-3-one (M-BIT) and/or iv. 5 ppm to 500 ppm, preferably 5 ppm to 400 ppm, particularly preferably 5 ppm to 300 ppm of 1,2-benzisothiazolin-3-one (BIT) and/or v. 10 ppm to 2000 ppm, preferably 50 ppm to 1000 ppm, particularly preferably 100 ppm to 750 ppm of 1,2-octanediol and/or vi. 10 ppm to 2000 ppm, preferably 50 ppm to 1000 ppm, particularly preferably 100 ppm to 750 ppm of ethylhexylglycerol and/or vii. 10 ppm to 9000 ppm, preferably 100 ppm to 6000 ppm, particularly preferably 500 ppm to 4500 ppm of phenoxyethanol and/or viii. 10 ppm to 200 ppm, preferably 50 ppm to 150 ppm, particularly preferably 75 ppm to 100 ppm of 3-iodopropynyl N-butylcarbamate (IPBC).

According to a preferred embodiment, one or more biocides selected from the group consisting of 1,2-octanediol, 2-methylisothiazolin-3-one, 1,2-benzisothiazolin-3-one, 3-iodopropynyl N-butylcarbamate and 2-methyl-1,2-benzisothiazolin-3-one are added to the industrial product in the context of the method according to the invention. According to a particularly preferred embodiment, one or more biocides selected from the group consisting of 1,2-octanediol, 2-methylisothiazolin-3-one and 1,2-benzisothiazolin-3-one are added to the industrial product in the context of the method according to the invention.

The present invention further relates to a method for regulatable or controllable partial degradation of 5-chloro-2-methyl-4-isothiazolinone in an industrial product as defined above, or in an aqueous industrial product having a pH in the range from 7.0 to 9.5, comprising the steps of:

(a) charging a product containing:

i 25 ppm to 100 ppm, preferably 25 ppm to 75 ppm, particularly preferably 25 ppm to 50 ppm of 5-chloro-2-methyl-4-isothiazolinone (CMIT) and ii 50 ppm to 1000 ppm, preferably 75 ppm to 750 ppm, particularly preferably 100 ppm to 500 ppm of one or more zinc compounds selected from the group consisting of zinc oxide, zinc carbonate, zinc hydroxide and zinc hydroxycarbonate, and (b) decomposing a portion of the CMIT by addition of at least one pyrithione compound selected from sodium pyrithione, potassium pyrithione and calcium pyrithione in a total amount in the range from 25 ppm to 500 ppm, preferably in the range from 50 ppm to 250 ppm, particularly preferably in the range from 75 ppm to 250 ppm, based on the product, so that the concentration of the CMIT in the product is in the range from 5 to 15 ppm, preferably in the range from 10 to 15 ppm.

According to one embodiment of the invention, the method is characterized in that the decomposition of the 5-chloro-2-methyl-4-isothiazolinone in method step (b) is effected within a period in the range from 6 hours to 336 hours, preferably within a period of 12 hours to 168 hours, particularly preferably within a period in the range from 24 hours to 96 hours after addition of the at least one pyrithione compound. “Within the above-defined periods” means that the 5-chloro-2-methyl-4-isothiazolinone is decomposed or degraded starting from the moment of contact with the at least one pyrithione compound, so that the total content of 5-chloro-2-methyl-4-isothiazolinone is in the range from 5 to 15 ppm, based on the product, after said periods. The amount of pyrithione and zinc required for the particular partial degradation will be determined by a person skilled in the art using the methods known to them.

In connection with the embodiment relating to the method for regulatable or controllable partial degradation of 5-chloro-2-methyl-4-isothiazolinone, reference is made to the above general remarks and definitions.

The present invention furthermore also relates to the use of at least one pyrithione compound selected from sodium pyrithione, potassium pyrithione and calcium pyrithione in an amount in the range from 25 ppm to 500 ppm, preferably in the range from 50 ppm to 250 ppm, particularly preferably in the range from 75 ppm to 150 ppm, based on the product, for partial decomposition of 5-chloro-2-methyl-4-isothiazolinone in an industrial product as defined above, or in an aqueous industrial product having a pH in the range from 7.0 to 9.5, containing:

i 25 ppm to 100 ppm, preferably 25 ppm to 75 ppm, particularly preferably 25 ppm to 50 ppm of 5-chloro-2-methyl-4-isothiazolinone (CMIT) and ii 50 ppm to 1000 ppm, preferably 75 ppm to 750 ppm, particularly preferably 100 ppm to 500 ppm of one or more zinc compounds selected from the group consisting of zinc oxide, zinc carbonate, zinc hydroxide and zinc hydroxycarbonate.

The at least one pyrithione compound is used in such a way that the 5-chloro-2-methyl-4-isothiazolinone is decomposed or degraded within a period in the range from 6 hours to 336 hours, preferably within a period of 12 hours to 168 hours, particularly preferably within a period in the range from 24 hours to 96 hours after addition of the at least one pyrithione compound apart from a content in the range from 5 to 15 ppm, preferably 10 to 15 ppm, in the industrial product, and so the total content of 5-chloro-2-methyl-4-isothiazolinone after these periods is in the range from 5 to 15 ppm, based on the product. The amount of pyrithione and zinc required for the particular partial degradation will be determined by a person skilled in the art using the methods known to them.

In connection with the embodiment relating to the use of the at least one pyrithione compound selected from sodium pyrithione, potassium pyrithione and calcium pyrithione in an amount in the range from 25 ppm to 500 ppm for partial decomposition of 5-chloro-2-methyl-4-isothiazolinone, reference is made to the above general remarks and definitions.

The present invention will be described in greater detail on the basis of the example shown below:

The amounts of 5-chloro-2-methyl-4-isothiazolinone and zinc oxide specified in Table 1 were added to and homogeneously incorporated in aliquots of a commercially available, preservative-free, water-based matt interior dispersion paint (pH: 8.3; binder: ethylene vinyl acetate; pigment volume concentration (PVC): 77%). After 30 to 45 minutes, the sodium pyrithione was then added. The controls used were samples containing chloro-2-methyl-4-isothiazolinone and sodium pyrithione without zinc oxide and samples containing chloro-2-methyl-4-isothiazolinone only. The samples were stored at 21° C. and, after the time intervals specified in Table 1 (4 hours, 24 hours, 72 hours, 168 hours and 336 hours), the amount of chloro-2-methyl-4-isothiazolinone remaining in the paint was determined with the aid of HPLC analyses. The test results are shown in Table 1.

TABLE 1

| NaPy | CMIT | ZnO | CIMT [ppm] after storage at 21° C. | | | | |
|---|---|---|---|---|---|---|---|
| [ppm] | [ppm] | [ppm] | 4 [h] | 24 h | 72 h | 168 h | 336 h |
| 0 | 25 | 0 | 25 | 25 | 24 | 24 | 22 |
| 130 | 25 | 525 | 24 | 21 | 21 | 18 | 14 |
| 130 | 25 | 450 | 26 | 22 | 22 | 19 | 12 |
| 130 | 25 | 375 | 25 | 22 | 20 | 15 | 10 |
| 130 | 25 | 300 | 24 | 21 | 14 | 12 | 6 |
| 130 | 25 | 225 | 23 | 17 | 11 | 7 | 2 |
| 130 | 25 | 150 | 19 | 11 | 6 | 2 | <LOQ |
| 130 | 25 | 75 | 13 | 4 | 1 | <LOQ | <LOQ |
| 130 | 25 | 0 | <LOQ | <LOQ | <LOQ | <LOQ | <LOQ |
| 0 | 50 | 0 | 50 | 50 | 49 | 47 | 47 |
| 130 | 50 | 525 | 51 | 50 | 45 | 38 | 31 |
| 130 | 50 | 450 | 50 | 47 | 42 | 35 | 28 |
| 130 | 50 | 375 | 49 | 49 | 40 | 30 | 23 |
| 130 | 50 | 300 | 47 | 42 | 34 | 24 | 14 |
| 130 | 50 | 225 | 38 | 29 | 21 | 15 | 8 |
| 130 | 50 | 150 | 31 | 19 | 11 | 8 | 1 |
| 130 | 50 | 75 | 21 | 9 | 2 | <LOQ | <LOQ |
| 130 | 50 | 0 | 3 | <LOQ | <LOQ | <LOQ | <LOQ |
| 0 | 100 | 0 | 101 | 100 | 101 | 99 | 95 |
| 130 | 100 | 525 | 100 | 101 | 94 | 84 | 72 |
| 130 | 100 | 450 | 102 | 96 | 88 | 75 | 61 |
| 130 | 100 | 375 | 93 | 89 | 77 | 63 | 44 |
| 130 | 100 | 300 | 83 | 76 | 64 | 47 | 28 |
| 130 | 100 | 225 | 67 | 56 | 37 | 22 | 14 |
| 130 | 100 | 150 | 52 | 39 | 28 | 16 | 5 |
| 130 | 100 | 75 | 37 | 25 | 13 | 6 | <LOQ |
| 130 | 100 | 0 | 8 | <LOQ | <LOQ | <LOQ | <LOQ |

<LOQ: below the limit of determination (<0.5 ppm CMIT); NaPy: sodium pyrithione; CMIT: chloro-2-methyl-4-isothiazolinone; ZnO: zinc oxide.

As can be seen from the results shown in Table 1, a person skilled in the art proceeding from different starting amounts of chloro-2-methyl-4-isothiazolinone (25 ppm/50 ppm/100 ppm) and using 130 ppm of sodium pyrithione and variable amounts of zinc oxide will be able to lower the original content of chloro-2-methyl-4-isothiazolinone in the composition to the target amount within the desired time.

The invention claimed is:

1. A method for reducing microbial contamination of an aqueous industrial product, comprising the steps of:

(a) providing an aqueous industrial product having a pH in the range from 7.0 to 9.5, containing:
   i. 25 to 100 ppm of 5-chloro-2-methyl-4-isothiazolinone (CMIT) and
   ii. 50 ppm to 1000 ppm of one or more zinc compounds selected from the group consisting of zinc oxide, zinc carbonate, zinc hydroxide and zinc hydroxycarbonate, (b) decomposing a portion of the CMIT by addition of at least one pyrithione compound selected from sodium pyrithione, potassium pyrithione and calcium pyrithione in a total amount in the range from 25 ppm to 500 ppm, so that the concentration of the CMIT in the industrial product is in the range from 5 to 15 ppm, and (c) storing the industrial product for a period of up to 9 months.

2. The method as claimed in claim 1, wherein the decomposition of a portion of the CMIT in method step (b) is effected within a period in the range from 6 hours to 336 hours after addition of the at least one pyrithione compound.

3. The method as claimed in claim 1, wherein an industrial product having a pH in the range from pH 7.5 to pH 9.0 is provided in method step (a).

4. The method as claimed in claim 1, wherein the industrial product provided in method step (a) contains
   ii. 50 ppm to 1000 ppm of zinc oxide.

5. The method as claimed in claim 1, wherein the decomposition of the CMIT in method step (b) is effected by addition of sodium pyrithione in an amount in the range from 25 ppm to 250 ppm.

6. The method as claimed in claim 1, wherein an industrial product is provided in method step (a) that further contains:
   iii. 5 ppm to 200 ppm of one or more compounds selected from the group consisting of 2-methylisothiazolin-3-one, 1,2-benzisothiazolin-3-one, 2-n-octyl-4-isothiazolin-3-one and 2-methyl-1,2-benzisothiazolin-3-one, and/or
   iv. 10 ppm to 2000 ppm of 1,2-octanediol, and/or
   v. 10 ppm to 2000 ppm of ethylhexylglycerol, and/or
   vi. 10 ppm to 9000 ppm of phenoxyethanol, and/or
   vii. 10 ppm to 200 ppm of 3-iodopropynyl N-butylcarbamate.

7. The method as claimed in claim 1, wherein the industrial product provided in method step (a) contains
   i. 25 to 100 ppm of 5-chloro-2-methyl-4-isothiazolinone (CMIT) having a content of 2-methyl-4-isothiazolin-3-one in the range from 0% to 2% by weight, based on the total proportion of 5-chloro-2-methyl-4-isothiazolin-3-one.

8. The method as claimed in claim 1, wherein the industrial product provided in method step (a) is a paint.

9. The method as claimed in claim 1, wherein the industrial product provided in method step (a) is a paint or plaster/render.

10. The method as claimed in claim 1, wherein the industrial product provided in method step (a) contains 2-methyl-4-isothiazolinone in a total amount of less than 10 ppm.

11. A method for partial degradation of 5-chloro-2-methyl-4-isothiazolinone, comprising the steps of:

(a) charging an industrial product containing:

i 25 ppm to 100 ppm of 5-chloro-2-methyl-4-isothiazolinone (CMIT) and ii 50 ppm to 1000 ppm of one or more zinc compounds selected from the group consisting of zinc oxide, zinc carbonate, zinc hydroxide and zinc hydroxycarbonate, and (b) decomposing a portion of the CMIT by addition of at least one pyrithione compound selected from sodium pyrithione, potassium pyrithione and calcium pyrithione in a total amount in the range from 25 ppm to 500 ppm, based on the industrial product.

12. A method of using at least one pyrithione compound selected from sodium pyrithione, potassium pyrithione and calcium pyrithione in an amount in the range from 25 ppm to 500 ppm for partial decomposition of 5-chloro-2-methyl-4-isothiazolinone in an industrial product containing:

i 25 ppm to 100 ppm of 5-chloro-2-methyl-4-isothiazolinone (CMIT) and ii 50 ppm to 1000 ppm of c selected from the group consisting of zinc oxide, zinc carbonate, zinc hydroxide and zinc hydroxycarbonate.

13. The method as claimed in claim 8, wherein the paint is selected from the group consisting of exterior paints, interior paints and wood paints, varnishes, stains, printing inks, and pasty plasters/renders.

14. The method as claimed in claim 13, wherein the pasty plasters/renders are selected from the group consisting of external renders and internal plasters, filler compounds, emulsions, latices, polymer dispersions, primers, chalk suspensions, mineral slurries, ceramic materials, adhesives, sealants, bitumen emulsions, surfactant solutions, cleaning products, pigment pastes and pigment dispersions, pigment slurries, thickeners, cosmetic products, toiletries, lithographic liquids, liquids in paper processing, liquids in leather production and liquids in textile production.

15. The method as claimed in claim 1, wherein the industrial product provided in method step (a) contains 2-methyl-4-isothiazolinone in a total amount of less than 5 ppm.

16. The method as claimed in claim 1, wherein the industrial product provided in method step (a) contains 2-methyl-4-isothiazolinone in a total amount in the range from 0 to 1 ppm.

* * * * *